US005930079A

United States Patent [19]
Vera et al.

[11] Patent Number: 5,930,079
[45] Date of Patent: *Jul. 27, 1999

[54] SUSPENSION HAVING LIMITED TRAVEL FLEXURE FOR IMPROVED LOADABILITY

[75] Inventors: Daniel Vera, Temecula; David Wolf, Norco; Warren Coon, Poway; Aman Khan, Temecula, all of Calif.

[73] Assignee: Magnecomp Corp., Temecula, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/719,914

[22] Filed: Sep. 25, 1996

Related U.S. Application Data

[60] Provisional application No. 60/024,286, Aug. 21, 1996, and provisional application No. 60/024,827, Aug. 28, 1996.

[51] Int. Cl.⁶ ............................................. G11B 5/48
[52] U.S. Cl. ............................................. 360/104
[58] Field of Search ..................... 360/103–105

[56] References Cited

U.S. PATENT DOCUMENTS

| | | | |
|---|---|---|---|
| 4,663,682 | 5/1987 | McNeil | 360/105 |
| 4,724,500 | 2/1988 | Dalziel | 360/104 |
| 4,922,356 | 5/1990 | Yamaguchi et al. | 360/104 |
| 5,166,845 | 11/1992 | Thompson et al. | 360/104 |
| 5,172,286 | 12/1992 | Jurgenson | 360/104 |
| 5,208,712 | 5/1993 | Hatch et al. | 360/105 |
| 5,282,103 | 1/1994 | Hatch et al. | 360/104 |
| 5,333,085 | 7/1994 | Prentice et al. | 360/104 |
| 5,367,419 | 11/1994 | Kazama | 360/104 |
| 5,815,349 | 9/1998 | Frater | 360/104 |

FOREIGN PATENT DOCUMENTS

| | | | |
|---|---|---|---|
| 59-186173 | 10/1984 | Japan | 360/104 |
| 60/258778 | 12/1985 | Japan | 360/104 |
| 60/245477 | 9/1989 | Japan | 360/104 |
| 04/061672 | 2/1992 | Japan | 360/104 |
| 60/012801 | 1/1994 | Japan | 360/104 |
| 6195851 | 7/1994 | Japan | 360/104 |

*Primary Examiner*—Allen T. Cao
*Attorney, Agent, or Firm*—Louis J. Bachand

[57] ABSTRACT

Unduly large travel of a flexure resulting in overflexure or the permanent loss of dimple contact between flexure and load beam in a disk drive suspension is blocked by having the flexure and load beam loosely coupled by a blocking structure which freely permits desired movement, within a predetermined range, but blocks other movement, by defining a gap between flexure and load beam equal to or less than the maximum tolerable amount of travel against movement beyond the predetermined range.

5 Claims, 4 Drawing Sheets

SUSPENSION HAVING LIMITED TRAVEL FLEXURE FOR IMPROVED LOADABILITY

CROSS REFERENCES TO RELATED APPLICATIONS

This application claims the benefit of U.S. Provisional patent applications Ser. Nos. 60/024,286 filed Aug. 21, 1996, abandoned and 60/024,827 filed Aug. 28, 1996 abandoned.

TECHNICAL FIELD

This application relates to disk drive suspensions, and more particularly to improvements in flexures and load beam assemblies for disk drive suspensions to allow the expected freedom of movement between the load beam and the flexure and at the same time limit the flexure travel relative to the load beam to the degree needed to prevent damage to flexure, the load beam and their assembly. In an important aspect, the invention provides modifications to conventional load beams and flexures for better performance, the modified components being readily manufactured using conventional fabrication techniques.

BACKGROUND OF THE INVENTION

Flexures in suspensions support a slider carrying the head in proximity to the disk. Loadability in a head is a property by which the head can be lifted from proximity to the disk when required without damage to either the head or the disk. In previously known suspensions reliance is placed on the stiffness of the flexure in pitch to insure adequate preload of the dimple against the load beam so that when the suspension is lifted off the disk, the slider and head will follow. Depending on several variable factors such as speed of pickup, stiffness of the flexure, mass of the slider, and specific characteristics of the cam that picks up the suspension, among others, the dimple may or may not stay in contact with the load beam.

SUMMARY OF THE INVENTION

The result of the dimple separating from the load beam may be fatal to the further use of the suspension, if permanent dimple separation occurs, or not seriously if permanent dimple separation does not happen.

When the dimple is permanently lifted away or separated from the flexure, the slider may not lift high enough to clear the disk during the next load or unload operation, possibly resulting in further damage to the disk, slider, or access mechanism. Even a flexure that is deformed only enough to allow non-permanent dimple separation may have an undesirable albeit not fatal property of a new bias or change from the original design orientation that the slider flying attitude is degraded, and electrical performance suffers.

In some designs, the dimple is formed out of the load beam instead of the flexure, but the basic problem remains of holding the dimple close enough to the surface it pivots on that the flexure can not bend enough to produce a permanent gap at the dimple.

In other respects, a desirable quality of a flexure is low stiffness to allow the slider to comply with the disk surface waviness, angular misalignment, or stack tolerance buildup. Thus, simply increasing the flexure stiffness does not resolve the loadability problem.

Resolution of the problem of undue separation distance between the load beam and the flexure is not profitably achieved where there is a loss in responsiveness of the flexure, as by unduly constraining its normal range of movement, or a significant increase in manufacturing costs.

It is an object therefore to provide a disk drive suspension in which the head has loadability. Another object is to provide a modified slider which overcomes the dimple separation problem inimical to loadability in the head. A further object is to provide a load beam and flexure assembly which is readily manufactured at no appreciable increase in costs, but which has delimited travel as required. Yet another object is to provide such an assembly in which flexure movement through the desired or normal range is untrammeled even while limiting undue travel.

In general, the invention provides a novel flexure and load beam assembly, and novel load beam and/or flexure components for supporting a slider in a disk drive suspension for free movement within a predetermined range, which is blocked or limited from movement beyond that range. The invention provides, incorporated into the flexure, or the load beam, structure to limit excessive, damaging travel of the flexure away from the load beam, which structure permits untrammeled movement in the desired range for the flexure on and about its dimple contact with the load beam. Significantly, the new flexure configuration does not reduce or vary the desirable properties of the flexure, and requires little modification in flexure and load beam fabrication or in suspension manufacturing operations. In particular embodiments of the invention, the load beam and flexure separately define cooperating structures free of engagement during the desired range of relative movement of the flexure and load beam, but in engagement in the event of possible movement beyond the desired range of relative movement between flexure and load beam such as may occur in shifting the head from the disk.

The cooperating structures are arranged on the load beam and or flexure to interfit or overlap or otherwise intersect the plane of the other without contact during relative movement of the load beam and flexure within the desired range, i.e. the range where movement does not permanently, or partially, damage the suspension performance. On the other hand, undue movements of the load beam and flexure such as may occur during loading of the head are blocked.

Specifically, in accordance with the invention, there is provided between the load beam and the flexure, defined by the cooperating structures, a limiter feature which allows the flexure, in addition to the freedom of movement noted above, also to have low stiffness for disk compliance while preventing the flexure from separating enough to allow permanent dimple separation. In general, the limiter is integral with the flexure or load beam and blocks undue flexure travel by blocking further travel or separation between the load beam and flexure than is desired, or which can lead to permanent dimple separation or other problems.

The limiter is readily shaped during the flexure or load beam etching step in the flexure or load beam fabrication process e.g. by defining as a flat pattern a tee, the center or leg portion of which extends from the flexure proper. The arms of the tee are foldable into a blocking structure arranged to oppose the load beam on the side opposite the location of the flexure, which position is assumed when the tee leg is folded around the load beam after welding the flexure to the load beam. The folded over arms are folded toward each other to a parallel relation continuing from the leg. The arms define a hard stop for the flexure tending to travel too far as they strike the load beam and block further travel. The normal gimballing of the flexure continues unrestricted, only the travel range from the dimple is restricted before permanent damage can occur.

This is accomplished, for example, by adding a "tee" shaped appendage, or continued extent, to the end of the flexure, arranged to oppose the load beam. Or, the load beam can be provided with a continued extent which folds upon itself to bracket the opposed flexure. Or, the flexure continued extent can be an angled portion provided with an aperture in which the load beam, or a continued extent thereof, is loosely captured. In each variation, the load beam and flexure are opposed in some manner at a predetermined gap which corresponds to the desired maximum of travel. Closing of the gap by relative movement of the opposed parts results in interference between the parts and blocking of further movement.

In general, it is the objective of the invention to prevent such shifting of the flexure that it is irreversibly bent, on its load beam-mounted base as a fulcrum, from contact with the dimple. This condition of irreversible bending results from a flexing of the flexure to or past the point where the flexure can recover, the point at which the springing function, spring memory, or resilience, of the flexure is overwhelmed. We use the term overflexed to describe the condition of a flexure which has been bent so far that it will not recover its former shape, or at least will not recover sufficiently to again be in dimple contact with the load beam, analogously to the overcenter reshaping of spring metal with the added caveat that there is no recovery or snapping back from an overflexed condition. The overflexed condition is indicative of a useless flexure. By limiting the amount of travel of the flexure away from the dimple contact point with the load beam, in accordance with the invention, the overflexed flexure condition is avoided and disk drive suspensions saved.

The foregoing and other objects of the invention to become apparent hereinafter are realized in a disk drive suspension comprising a load beam, a flexure supported by the load beam at a first locus and in predetermined dimple contact therewith at a second locus for gimbal carriage of a slider and head, the flexure and load beam having cooperating structure blocking flexure overflexing movement relative to the load beam causing loss of the predetermined dimple contact.

In this and like embodiments: typically, the cooperating structure includes a flexure portion intersecting with a load beam portion in interfering relation to block flexure overflexing movement; the cooperating structure is between the locus of support of the flexure on the load beam and the locus of the dimple contact; the flexure has a continued extent, the flexure continued extent being folded on itself in load beam receiving relation at a predetermined gap which leaves the flexure free to move relative to the load beam in dimple contact but which upon closure of the gap blocks relative movement thereof causing overflexing of the flexure and consequent loss of the dimple contact, the flexure continued extent being integrally formed with the flexure; or, the flexure has an angled extension angled toward the plane of the load beam and locally apertured, the load beam having a continued extent received within the flexure angled extension aperture at a predetermined gap which leaves the load beam and the flexure free to move relatively in dimple contact but which upon closure of the gap blocks relative movement causing overflexing of the flexure and consequent loss of dimple contact, the flexure angled extension being integrally formed with the flexure; or, the load beam has a continued extent folded on itself in flexure receiving relation at a predetermined gap which leaves the flexure free to move relative to the load beam in dimple contact but which upon closure of the gap blocks relative movement causing overflexing of the flexure and consequent loss of dimple contact, the load beam continued extent being integrally formed with the load beam; the flexure defines a dimple opposite the load beam for the dimple contact; or, the load beam defines a dimple opposite the flexure for the dimple contact.

The invention further contemplates a head stack assembly incorporating the disk drive suspension described.

In another embodiment, the invention provides a disk drive suspension flexure supportable by a load beam and arranged for separate predetermined dimple contact therewith for gimbal carriage of a slider and head, the flexure having structure engageable with the load beam in the supported condition of the flexure for blocking flexure overflexing movement relative to the load beam causing loss of the predetermined dimple contact.

In this and like embodiments, typically: the flexure structure is located between the locus of flexure support on the load beam and the locus of dimple contact therebetween; the flexure structure comprises a flexure portion arranged to intersect with a load beam portion in interfering relation to block flexure overflexing movement; the flexure has a continued extent, the flexure continued extent being folded on itself in load beam receiving relation at a predetermined gap which leaves the flexure free to move relative to the load beam in dimple contact but which upon closure of the gap blocks relative movement thereof causing overflexing of the flexure and consequent loss of the dimple contact, the flexure continued extent being unitary with the flexure.

In a further embodiment, the flexure has an angled extension adapted to be angled toward the plane of the load beam, the extension being locally openly- or closed-apertured to loosely capture the load beam in a manner leaving the load beam and the flexure free to move relatively in dimple contact while blocking such relative movement causing overflexing of the flexure and consequent loss of dimple contact. Typically, the flexure angled extension is unitary with the flexure; and, the flexure defines a dimple arranged to oppose the load beam for the dimple contact. As in previous embodiments, this embodiment contemplates a head stack assembly incorporating this disk drive suspension flexure.

In a still further embodiment, the invention provides a disk drive suspension load beam for supporting a flexure arranged for separate predetermined dimple contact therewith for gimbal carriage of a slider and head, the load beam having structure engageable with the flexure in the supported condition of the flexure for blocking flexure overflexing movement relative to the load beam causing loss of the predetermined dimple contact. In this embodiment, the load beam has a continued extent folded on itself in flexure receiving relation at a predetermined gap which leaves the flexure free to move relative to the load beam in dimple contact but which upon closure of the gap blocks relative movement causing overflexing of the flexure and consequent loss of dimple contact; the load beam continued extent is unitary with the load beam; and, the load beam defines a dimple opposite the flexure for the dimple contact. This load beam can be incorporated in a head stack assembly as well.

The invention further provides a disk drive suspension comprising a load beam mounting at a first location a flexure, the flexure being in dimple contact therewith at a second location for gimbal carriage of a slider and head, the flexure having a continued extent selectively engaging the load beam at a third location opposite and spaced from the first and second locations to block irreversible shifting of the flexure away from the dimple contact.

The invention further provides a disk drive suspension with loadable head, the suspension having a load beam and a flexure with a tee-shaped continued extent foldable over the flexure at a predetermined gap in load beam bracketing relation to oppose shifting of the flexure beyond the distance permitted by the gap between the flexure continued extent and the load beam, whereby the flexure is positively prevented from overflexing.

The invention further provides a disk drive suspension with a loadable head, the suspension having a load beam and a flexure, the flexure having a portion carrying a slider and the loadable head and a frame surrounding the portion, a flexure body continued extent angled relative to the flexure frame toward the load beam, the continued extent being apertured in load beam receiving relation at a predetermined gap to oppose shifting of the flexure beyond the distance permitted by the gap between the flexure continued extent aperture and the load beam received therein, whereby the flexure is positively prevented from overflexing.

The invention further provides a disk drive suspension with a loadable head, the suspension having a load beam and a flexure, the flexure carrying a slider and the loadable head, the load beam having a continued extent arranged to bracket the flexure at a predetermined gap to oppose shifting of the flexure beyond the distance permitted by the gap between the load beam and the flexure bracketed thereby, whereby overflexing movement of the flexure is positively blocked by the load beam continued extent.

In its method aspects, the invention contemplates the method of blocking overflexing of a disk drive suspension in movement away from a load beam by which the flexure is supported and with which the flexure is in dimple contact, including opposing portions of the load beam and flexure at a predetermined gap, and upon movement of the flexure sufficient to close the gap engaging the opposed flexure and load beam portions to block further movement of the flexure causing an overflexed condition in the flexure.

BRIEF DESCRIPTION OF THE DRAWINGS

The invention will be further described in conjunction with the attached drawings in which.

DETAILED DESCRIPTION

Figure 1:
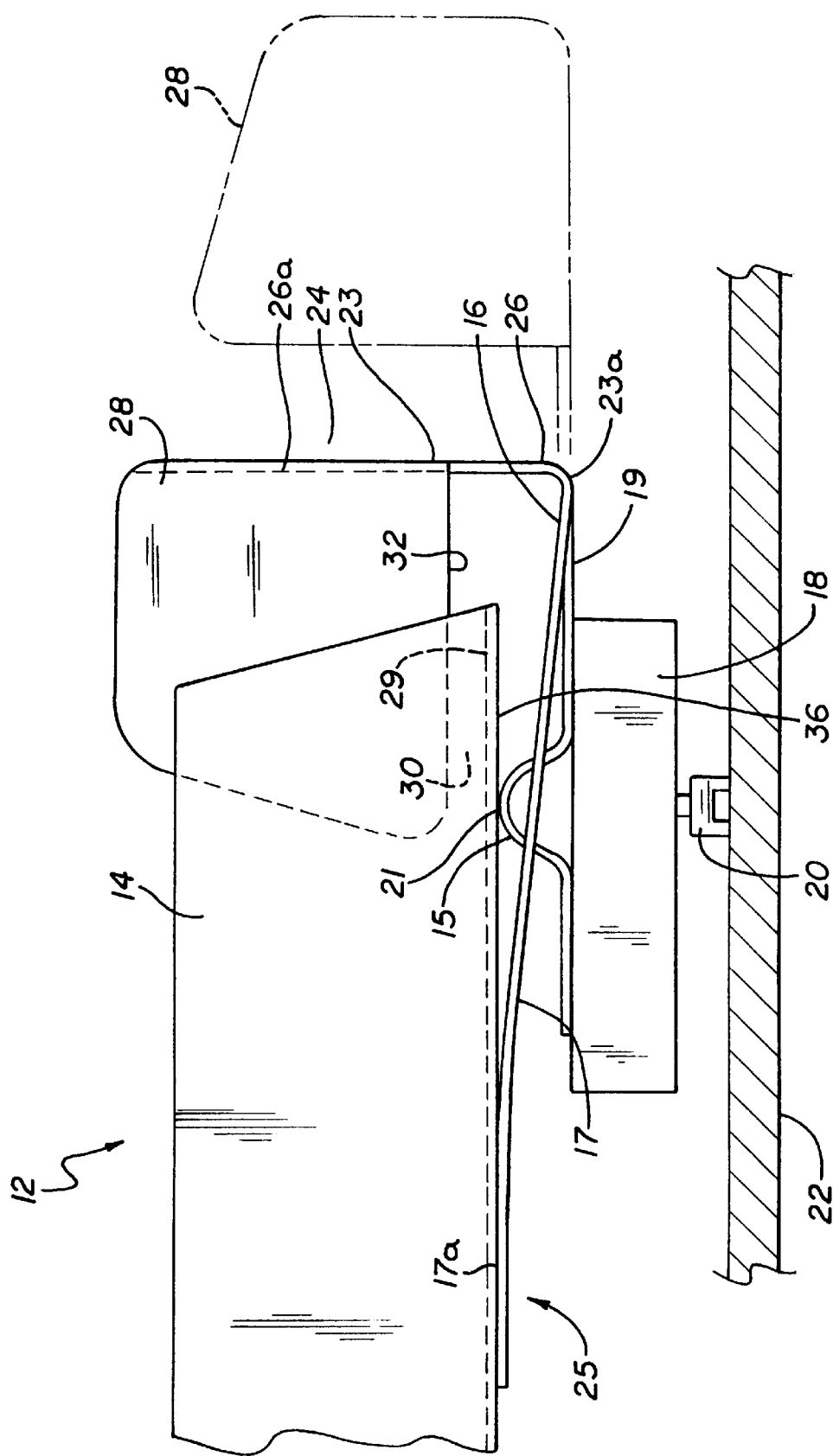
FIG. 1 is a side elevation view of a disk drive suspension load beam and flexure according to one embodiment of the invention.
Figure 6:
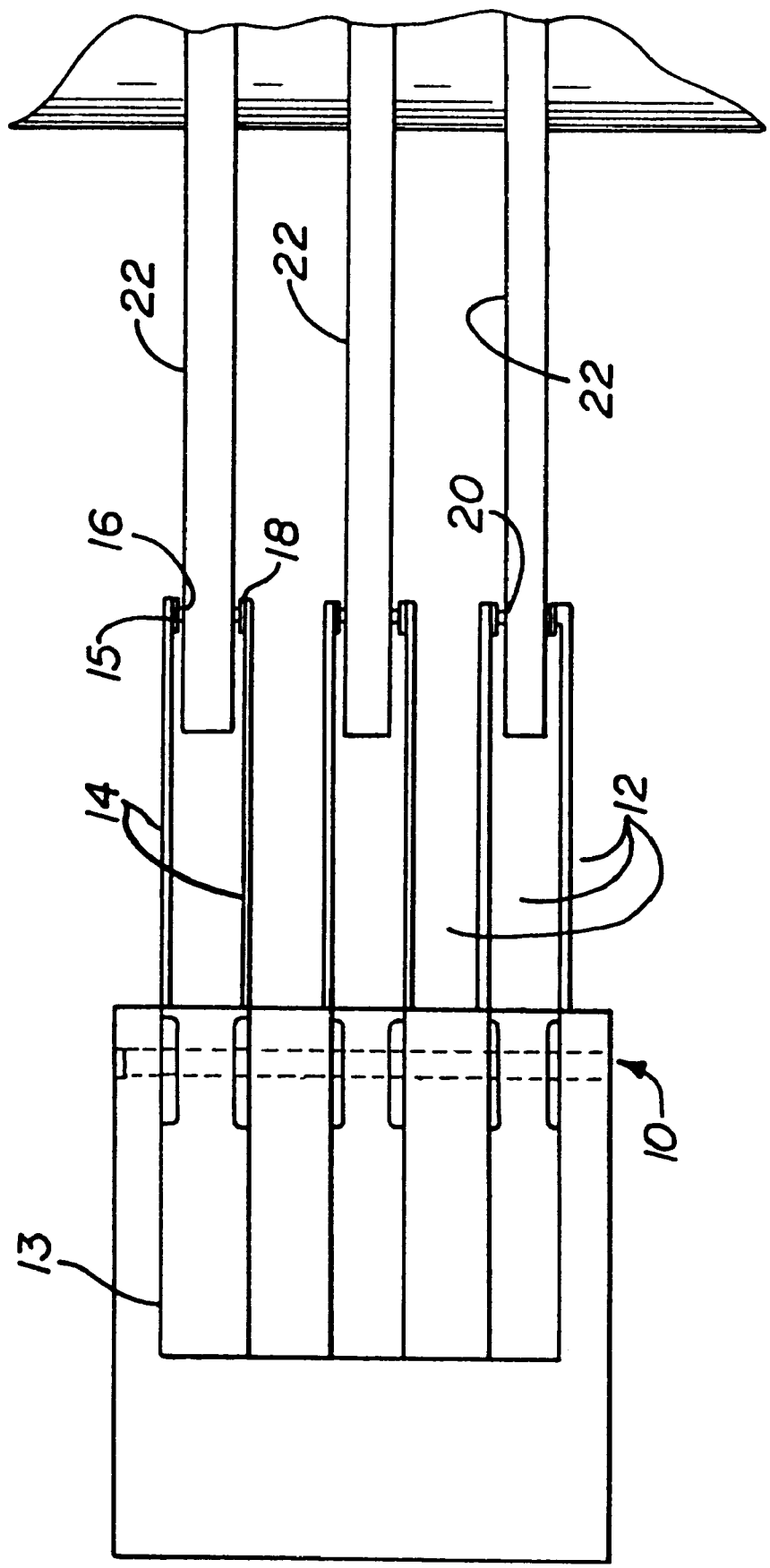
FIG. 6 is a side elevation view of a disk drive suspension according to the invention in a stack assembly.

With reference now to the drawings in detail, in FIGS. 1 and 6 a vertically stacked series 10 of disk drive suspensions 12 is shown. Each suspension 12 includes an actuator 13, a load beam 14, a flexure 16, a dimple 15 between the load beam and flexure about which the flexure will gimbal, slider 18, and head 20, assembled together so that the head is suspended at the disk surfaces 22 in the known manner.

It is the contribution of the present invention that the disk drive suspensions are prevented from becoming inoperative or damaged from excess movement of the flexure away from the load beam. The endwise mounting of the flexure 16 on the load beam 14 will allow the flexure to flex outwardly from the load beam, losing contact at dimple 15. When overflexed by this outward movement, the flexure 16 will not return to contact with dimple 15 and the disk drive suspension 12 is permanently inoperative.

With reference to FIG. 1, the suspension 12 comprises load beam 14 supported by an actuator 13 in FIG. 6. Load beam 14 supports flexure 16 comprising a frame 17 and tongue 19 projecting into the center of the frame. The frame 17 is endwise welded to the load beam 14 at 17a so as to be cantilevered. The flexure tongue 19 is also cantilevered and in the opposite direction of the flexure 16 cantilever. Tongue 19 of flexure 16 defines a dimple 15 with which it contacts the load beam at a locus 21 spaced from the flexure mounting locus 25 to the load beam 14. Flexure tongue 19 supports a slider 18 and a head 20. Gimballing of the tongue 19 and thus slider 18 and head 20 is around dimple 15 formed in the flexure tongue and engaged with the lower side (in the drawing) of the load beam 14. The dimple can be formed in the load beam. The assembly shown can be inverted in a given installation. Cf FIG. 6.

In the invention embodiment of FIG. 1, flexure 16 is formed with a continued extent 23 extending beyond the usual terminus 23a of the flexure. The continued extent 23 is conveniently formed in the usual course of flexure fabrication by simple adjustment of the pattern to be etched. In this embodiment, flexure continued extent 23 has generally the shape of a tee 24, comprising a leg portion 26, and a pair of outstretched arms 28. The flexure 16 is typically formed flat and as shown is folded twice on itself such that the arms 28 are folded toward each other to be a right angles to the general plane of the flexure 16, and then again on its longitudinal axis and out of its general plane to be partially above the load beam 14, on the side of the load beam away from the mounting locus 25 of the flexure to the load beam, and in a position generally opposite the flexure tongue dimple 15 across the load beam. That is, the arms 28 are themselves folded toward each other after being formed in a tee shape originally, by folding at a fold line 26a defined by a continuation of the tee leg portion 26 and the arms 28. Then the folded arms 28 are together folded toward the load beam 14 on line 26a. Thus folded, the arms 28 are doubled for strength in their engagement at 29 with the load beam 14 opposite.

The gap 30 between the load beam 14 and the under edges 32 of the arms 28 is predetermined based on an analysis of the maximum travel to be allowed the flexure 16 away from the load beam 14 so as to avoid overflexing of the flexure. The gap 30 is fixed at a distance that is at or below the travel distance the flexure 16 would travel to be overflexed or irreversibly extended, or such other value as is desired to limit the travel short of irretrievable extension, e.g. to avoid creating unwanted biases in the device.

In operation, the suspension of the FIG. 1 embodiment limits the movement of the flexure 16, and consequently its dimple 15, too far from its locus of engagement 21 with the load beam underside 36. Flexure 16 movement is untrammeled within the dimensions of the gap 30, but also limited by the size of gap 30, since the flexure tongue 19 and dimple 15 cannot travel farther away from the load beam when the edges 32 of the arms 28 cross the entirety of the gap and are engaged with the load beam. Distorting, irreversible, overflexed change in the flexure 16 is thus avoided.

Figure 2:
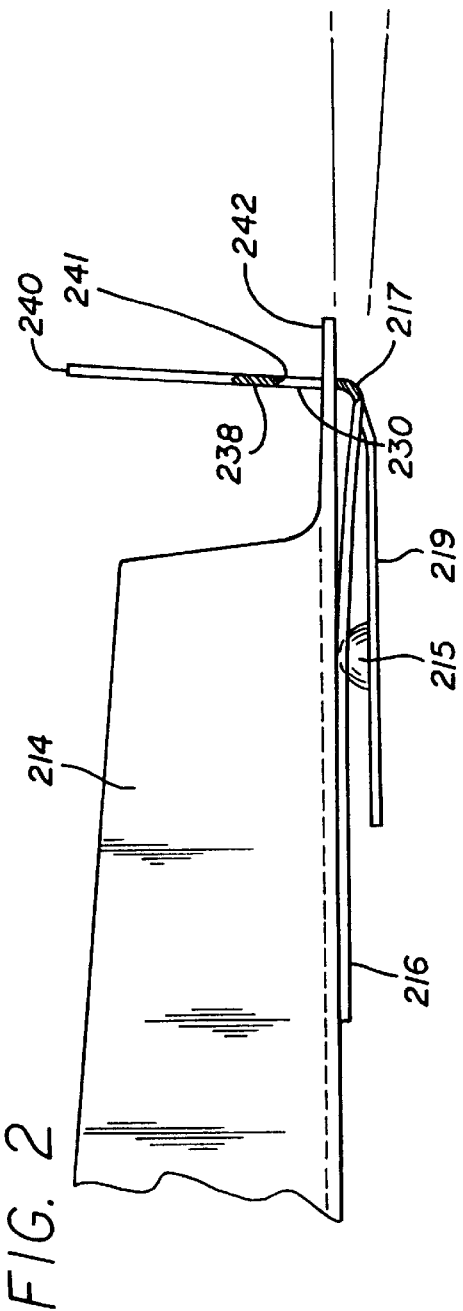
FIG. 2 is of a side elevation view like FIG. 1 of a second embodiment of the disk drive suspension load beam and flexure.
Figure 3:
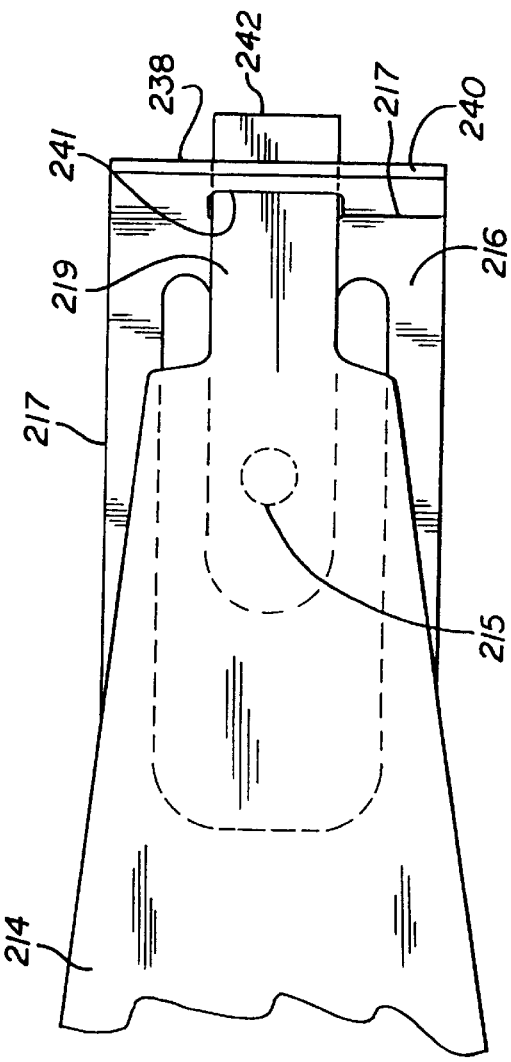
FIG. 3 is a bottom plan view thereof.

With reference to FIGS. 2 and 3, an alternate form of the invention is shown which utilizes the same principal of interfering with too great movement of the flexure from the load beam, but which achieves this common purpose by different means. Like parts to parts shown in FIG. 1 have like numbers plus 200, Thus, flexure 216 is mounted to load beam 214 as shown and has a tongue 219 defining a dimple 215. In this embodiment, the flexure frame 217 has a continued extent 238 displacing farther from the tongue 219 the outer edge 240 of the flexure frame. The flexure continued extent 238 is generally rectangular in configuration and is angled more or less from the general plane of the flexure frame 217, typically at an angle of from 5 to 90 degrees from that plane, the specific angle depending on the ultimate interference desired between the flexure continued extent 238, to be described. The continued extent 238 is apertured at 241, with either a closed aperture or an aperture which is open to the side. The size and shape of the flexure continued extent aperture 241 is such as will allow reception of the load beam 214, or a continued extent portion 242 thereof, within the flexure aperture 241. The reception of the load beam portion 242 is at a gap 230 which will permit free relative movement of the load beam 214 and flexure 216 until the gap 230 is traversed by the downward (in the Figure) movement of the flexure 216 relative to the load beam 214, at which point further separating movement between the load beam and flexure is arrested, thus saving the flexure from overflexing, or irretrievably bending beyond its ability to recover.

Figure 5:
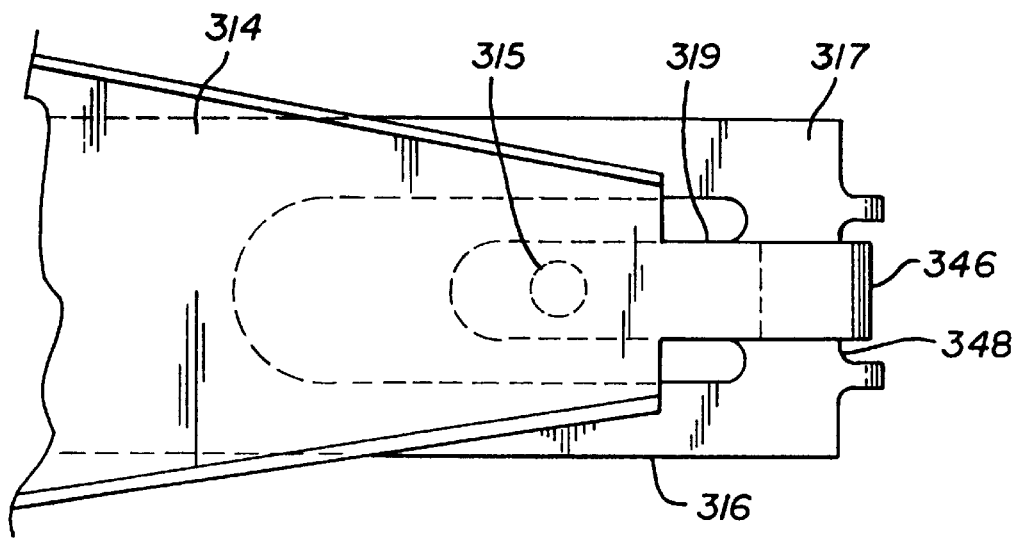
FIG. 5 is a plan view thereof.
Figure 4:
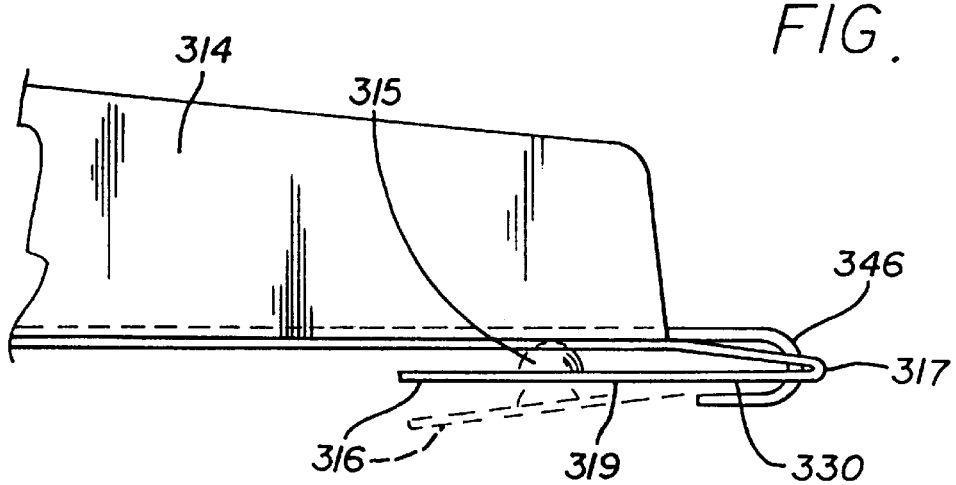
FIG. 4 is a side elevation view of a further embodiment of the disk drive load beam and flexure of the invention.

In FIGS. 4 and 5, a further embodiment is shown utilizing the same principle of interference with undue separative movement of the flexure and load beam, in this case by having the load beam bracket the flexure. Like parts to FIG. 1 have like numbers plus 300. Thus, with reference to FIGS. 4 and 5, the load beam 314 has a continued extent 346 which is curved downward and around the outer end 348 of frame 317 of the flexure 316. This bracketing of the flexure 316 by the load beam continued extent 346 is at a gap 330. As will be evident from the preceding embodiments, the gap 330 is set at a predetermined distance such that separative movement of the flexure 316 from the load beam 314 is blocked when the gap is traversed, and irreversible bending of the flexure is avoided.

The objects of the invention are thus met.

What is claimed is:

1. A disk drive suspension comprising a load beam, and a flexure comprising a frame and a tongue, said frame being supported by said load beam at a first locus, said tongue being supported by said frame at a junction with said frame and in predetermined dimple contact with said load beam at a second locus for gimbal carriage of a slider and head, said tongue extending proximally from said frame and having a proximal free end, said flexure frame having extending distally from said one opposite to said tongue a tee-shaped continued extent having a leg portion and outstretched left and right arms spaced from said frame by the length of said leg potion, said continued extent extending from said tongue and frame junction and centrally of said flexure frame, said continued extent arms being folded toward each other to be parallel with and spaced from each other and normal to the leg portion of said tee, said tee leg portion being folded along its length to have said spaced left and right arms lie over said load beam at a predetermined gap defined by said leg portion length in load beam-bracketing relation to oppose by left and right arm contact with said load beam shifting of said flexure beyond the distance permitted by the gap between the flexure frame continued extent tee portions and the load beam, whereby said flexure is positively prevented from overflexing.

2. The disk drive suspension according to claim 1, in which said flexure continued extent is integrally formed with said flexure frame and flexure tongue at the junction thereof.

3. A disk drive suspension having a load beam and a flexure, said flexure comprising a frame and a tongue joined at a junction, said flexure tongue carrying a slider, said flexure frame surrounding said tongue, a flexure frame continued extent flange transverse to the longitudinal axis of said flexure and angled relative to said flexure frame toward the plane of said load beam, said continued extent defining a closed aperture extending substantially the width of said continued extent in load beam receiving relation at a predetermined gap which leaves the load beam and the flexure free to move relatively in dimple contact but which upon closure of said gap blocks relative movement causing overflexing of said flexure and consequent loss of dimple contact.

4. The disk drive suspension according to claim 3, in which said flexure frame angled extension is integrally formed with said flexure frame and flexure tongue.

5. A disk drive suspension with loadable head, said suspension having a load beam and a flexure comprising a frame and tongue, said flexure frame having a distal tee-shaped continued extent including arms folded toward each other in spaced parallel relation and a leg spacing said arms from said flexure frame and foldable on itself to extend over said load beam at a predetermined gap defined by the extent of said leg in load beam-bracketing relation with said arms to oppose shifting of said flexure beyond the distance permitted by the gap between the flexure frame continued extent and the load beam, whereby said flexure is positively prevented from overflexing.

\* \* \* \* \*